(12) United States Patent
Ke

(10) Patent No.: US 10,855,929 B1
(45) Date of Patent: Dec. 1, 2020

(54) MONITORING METHOD OF MONITORING CAMERA AND MONITORING CAMERA

(71) Applicant: Guangdong Outdoor Technology Limited., Dongguan (CN)

(72) Inventor: Xiumei Ke, Dongguan (CN)

(73) Assignee: GUANGDONG OUTDOOR TECHNOLOGY LIMITED., Guangdong (CN)

( * ) Notice: Subject to any disclaimer, the term of this patent is extended or adjusted under 35 U.S.C. 154(b) by 0 days.

(21) Appl. No.: 16/454,431

(22) Filed: Jun. 27, 2019

(51) Int. Cl.
*H04N 5/235* (2006.01)
*G06T 7/50* (2017.01)
*H04N 7/18* (2006.01)

(52) U.S. Cl.
CPC .............. *H04N 5/2354* (2013.01); *G06T 7/50* (2017.01); *H04N 7/183* (2013.01)

(58) Field of Classification Search
CPC .............................. H04N 5/2354; H04N 7/183
See application file for complete search history.

(56) References Cited

U.S. PATENT DOCUMENTS

2004/0141056 A1* 7/2004 Izumi .................. G08B 13/187
348/143
2015/0374235 A1* 12/2015 Reimer ................... A61B 3/13
351/206
2019/0208113 A1* 7/2019 Sandstrom ............ G01S 7/4915

* cited by examiner

*Primary Examiner* — Girumsew Wendmagegn
(74) *Attorney, Agent, or Firm* — Shimokaji IP

(57) ABSTRACT

A monitoring method of a monitoring camera and a monitoring camera with an adaptive flash brightness control function is provided. The monitoring method includes: detecting whether a moving object enters a camera range of the monitoring camera; if yes, determining a distance between the moving object and the monitoring camera; and adjusting the brightness of a flash light on the monitoring camera according to the distance between the moving object and the monitoring camera. By the monitoring method, the brightness of the flash light is adjusted according to the distance between the moving object and the monitoring camera, so that the monitoring camera provides appropriate brightness for the moving object at different distances within the camera range, thereby avoiding overexposure or underexposure to improve the quality of images.

9 Claims, 2 Drawing Sheets

MONITORING METHOD OF MONITORING CAMERA AND MONITORING CAMERA

FIELD OF THE INVENTION

The present invention relates to monitoring device, and more particularly to a monitoring method and a monitoring camera with an adaptive flash brightness control function.

BACKGROUND OF THE INVENTION

Compared with traditional cameras, monitoring cameras are mainly used for monitoring an object of interest in a scene. When the object of interest enters the scene, the monitoring camera senses and captures information, at this time the monitoring camera will take an image. Then the captured image is stored. Currently, monitoring cameras are widely used in the animal protection and outdoor hunting field. Since many animals move at night, it is important and difficult to take some high quality images at night. Usually, the monitoring cameras generally illuminate and have fixed-brightness by a flash light, which causes the object to be overexposed at a close distance. Some monitoring cameras use AE (Automatic Exposure Control) to adjust the exposure brightness. But at night, especially when the scene is relatively empty, the problem of close-range overexposure still cannot be solved by AE adjustment.

SUMMARY OF THE INVENTION

One objective of the present invention is to provide a monitoring method of a monitoring camera and a monitoring camera with an adaptive flash brightness control function that can adaptively adjust the brightness of a flash light according to a distance between the monitoring camera and a moving object (a target).

To achieve above-mentioned objective, the present invention provides a monitoring method of a monitoring camera with an adaptive flash brightness control function, including:

detecting whether a moving object enters a camera range of the monitoring camera;

if yes, determining a distance between the moving object and the monitoring camera; and adjusting the brightness of a flash light on the monitoring camera according to the distance between the moving object and the monitoring camera.

In comparison with the prior art, since the monitoring method of the present invention includes determining the distance between the moving object and the monitoring camera. When the moving object entering the camera range is detected, firstly, the monitoring camera determines a distance between the moving object and the monitoring camera, and then automatically controls to adjust a brightness of the flash light according to the distance. For example, when the moving object is closer to the monitoring camera, the brightness of the flash light is adjusted to be relatively weak, thereby avoiding being overexposed in a close range. When the moving object is far away from the monitoring camera, the brightness of the flash light will be adjusted to be relatively high, thereby avoiding insufficient light. Thus, by the monitoring method, the brightness of the flash light can be adjusted according to the distance between the moving object and the monitoring camera, so that the monitoring camera provides appropriate brightness for the moving object at different distances within the camera range.

Preferably, the distance between the moving object and the monitoring camera is determined by testing strength of a trigger signal of the moving object entering the camera range.

Preferably, said determining a distance between the moving object and the monitoring camera includes: detecting a trigger signal representing that the moving object enters the camera range and performing an integral processing to the trigger signal to obtain a level pulse representing the strength of the trigger signal, and comparing the level pulse with standard level pulses preset in the monitoring camera that correspond to different distances.

Preferably, a pyroelectric infrared sensor is applied to detect the moving object entering the camera range of the monitoring camera.

A monitoring camera with an adaptive flash brightness control function is also provided, which includes a camera body, and a detection device, a processing device, a flash light and a drive device respectively configured on the camera body. The detection device is arranged for detecting a trigger signal representing a moving object appearing in a scene in which the camera body is located, and feeding back the trigger signal. Furthermore, a processing device is arranged for receiving the trigger signal fed back by the detection device, then analyzing and calculating a distance between the moving object and the camera body according to the trigger signal. The flash light is arranged for providing a brightness compensation for the camera body at camera capturing moment, and the drive device is arranged for controlling flash brightness according to the distance calculated by the processing device.

Preferably, the processing device includes an amplifying circuit for amplifying the trigger signal, an integrating circuit for converting the trigger signal into a level pulse, and an analyzing circuit that compares the level pulse with standard level pulses preset in the camera body to determine a distance between the moving object and the camera body.

Preferably, the drive device includes a PWM driver which is electrically connected with the flash light.

Preferably, the detection device includes a pyroelectric infrared sensor.

Furthermore, the present invention provides a monitoring camera with an adaptive flash brightness control function including a processor, a memory, and a program. Specifically, the program is stored in the memory and executed by the processor, the program includes instructions for performing above-mentioned monitoring method of the monitoring camera with an adaptive flash brightness control function.

Furthermore, a readable storage medium is also provided, which includes a computer program cooperating with the monitoring camera. Specifically, the computer program is executed by a processor to adjust an adaptive flash brightness in above-mentioned monitoring method of the monitoring camera with an adaptive flash brightness control function.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

A distinct and full description of the technical solution of the present invention will follow by combining with the accompanying drawings.

Figure 1:
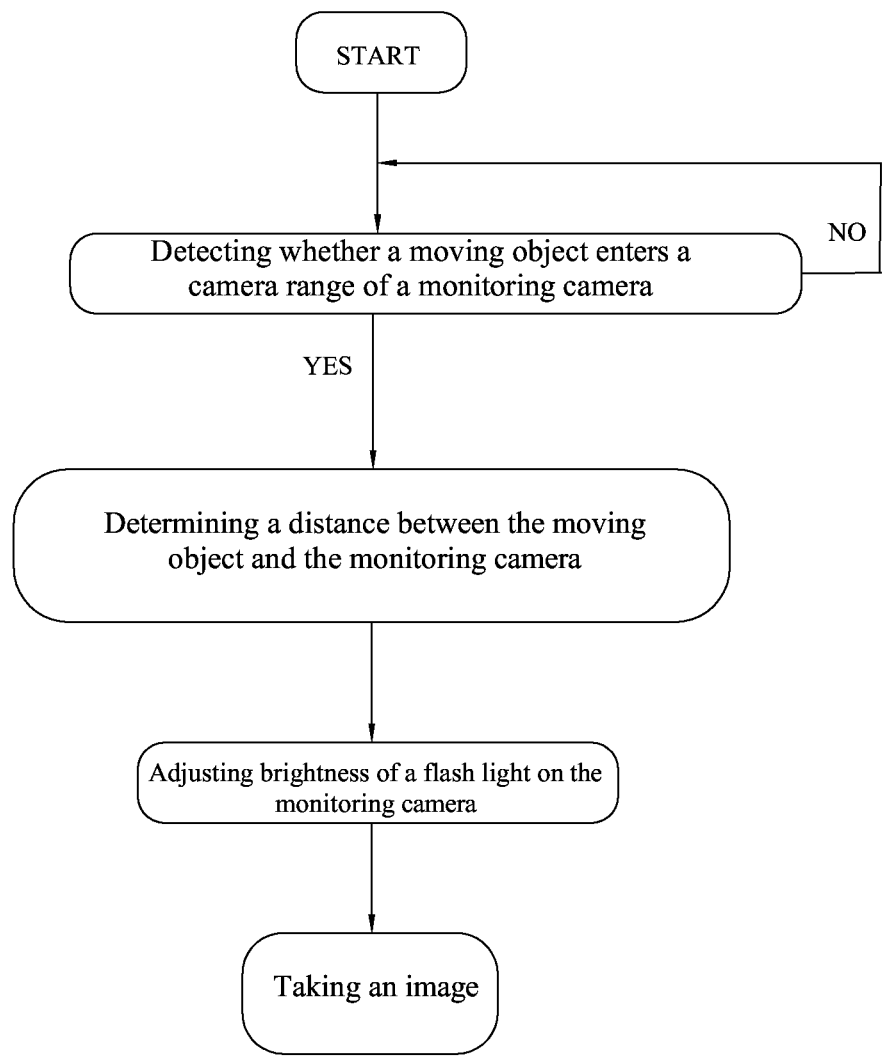
FIG. 1 is a schematic illustration of a monitoring method according to one embodiment of the present invention.

As shown in FIG. 1, a monitoring method of a monitoring camera with an adaptive flash brightness control function includes:

fixing the monitoring camera in an environment to be monitored, for example, installing the monitoring camera in a place where the wild deer often appear, and detecting whether a deer enters a camera range of the monitoring camera;

if yes, determining a distance between the deer and the monitoring camera; and adjusting the brightness of a flash light on the monitoring camera according to the distance between the deer and the monitoring camera.

Specifically, when the deer is closer to the monitoring camera, the flash light automatically adjusts to be relatively weak, thereby avoiding being overexposed in a close range. When the deer is far away from the monitoring camera, the brightness of the flash light will be adjusted automatically to be relatively high, thereby avoiding insufficient light. Thus, by the monitoring method, the brightness of the flash light will be automatically adjusted according to the distance between the deer and the monitoring camera, so that the monitoring camera provides appropriate brightness for the moving object at different distances within the camera range.

Figure 2:
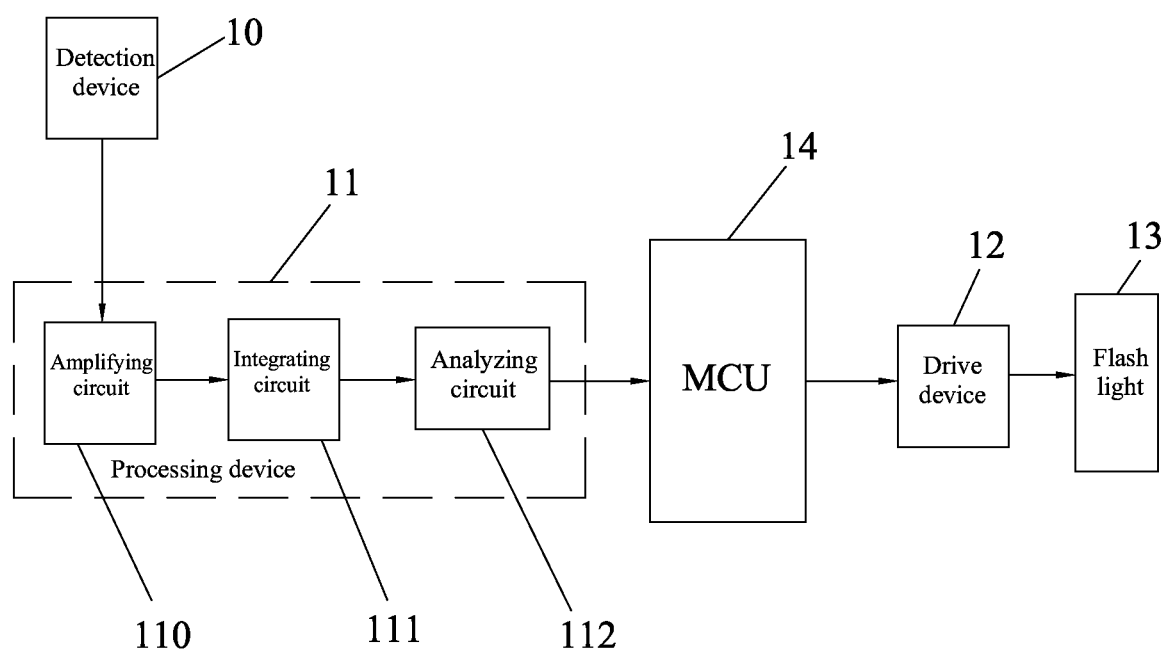
FIG. 2 is a schematic illustration of a monitoring camera according to one embodiment of the present invention.

In order to perform above-mentioned monitoring method, in one embodiment of the present invention, as shown in FIG. 2, a monitoring camera is provided, and the camera body includes a detection device 10, a processing device 11, a drive device 12, a flash light 13. Specifically, the flash light 13 is used for providing a brightness compensation for the camera body at camera capturing moment, and the detection device 10 is arranged for detecting a trigger signal showing a moving object appearing in a scene in which the camera body is located, and feeding back the trigger signal to the processing device 11. Then the processing device 11 receives the trigger signal fed back by the detection device 10, then analyzes and calculates a distance between the moving object and the camera body according to the trigger signal. Furthermore, the drive device 12 is used for controlling flash brightness according to the distance calculated by the processing device 11. When the detection device 10 detects that a moving object (for example, a deer) enters the camera range of the monitoring camera, a trigger signal caused by the deer is sent to the processing device 11, and the processing device 11 determines a distance between the deer and the monitoring camera according to the trigger signal. Then the processing device 11 feeds back the distance information then to the drive device 12, which adjusts the brightness of the flash light 13 based on the feedback information. In this embodiment, the detection device 10 is a pyroelectric infrared sensor.

In above-mentioned embodiment, the processing device 11 is applied to determine the distance between the moving object and the monitoring camera by testing the strength of trigger signal showing the moving object entering the camera range. As the distance between the moving object and the monitoring camera is from far to near, the trigger signal caused by the moving object become stronger gradually. Thus, the distance between the moving object and the monitoring camera can be analyzed and determined from the strength of the trigger signal. More specifically, determining a distance process between the moving object and the monitoring camera includes: detecting a trigger signal representing that the moving object enters the camera range and performing an integral processing to the trigger signal to obtain a level pulse representing the strength of the trigger signal, and comparing the level pulse with standard level pulses preset in the monitoring camera that correspond to different distances.

In order to achieve the above processing process, the processing device 11 includes an amplifying circuit 110 for amplifying the trigger signal, an integrating circuit 111 for converting the trigger signal into a level pulse, and an analyzing circuit 112 that compares the level pulse with standard level pulses preset in the camera body to determine a distance between the moving object and the camera body. Specifically, the pyroelectric infrared sensor transmits the detected trigger signal to the amplifying circuit 110 to amplify the trigger signal and then transmits the amplified trigger signal to the integrating circuit 111. Furthermore, the integrating circuit 111 converts the trigger signal into a level pulse, the analyzing circuit 112 compares the level pulse with standard level pulses preset in the camera body to determine a distance between the moving object and the camera body. After the distance is obtained, the drive device 12 is controlled by the control system 14 of the monitoring camera, thereby adjusting the brightness of the flash light 13. Preferably, the drive device 12 includes a PWM driver which is electrically connected with the flash light 13. More specifically, the MCU control system 14 outputs a corresponding PWM dimming wave to the PWM driver in accordance with the processing result of the processing device 11, thereby adjusting the brightness of the flash light 13. Further, it should be noted that the above analyzing circuit 112 can also be integrated in the control system 14 of the monitoring camera.

In another embodiment, another monitoring camera with an adaptive flash brightness control function is provided, which includes a processor, a memory, and a program. Specifically, the program is stored in the memory and executed by the processor, the program includes instructions for performing above-mentioned monitoring method of the monitoring camera with an adaptive flash brightness control function.

Furthermore, a readable storage medium is also provided, which includes a computer program cooperating with the monitoring camera. Specifically, the computer program is executed by a processor to adjust an adaptive flash brightness in above-mentioned monitoring method of the monitoring camera with an adaptive flash brightness control function.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A monitoring method of a monitoring camera with an adaptive flash brightness control function, comprising:
   detecting whether a moving object enters a camera range of the monitoring camera;
   if yes, determining a distance between the moving object and the monitoring camera: detecting a trigger signal representing that the moving object enters the camera range and performing an integral processing to the trigger signal to obtain a level pulse representing the strength of the trigger signal, and comparing the level pulse with standard level pulses preset in the monitoring camera that correspond to different distances; and adjusting brightness of a flash light on the monitoring camera according to the distance between the moving object and the monitoring camera.

2. The monitoring method of the monitoring camera with an adaptive flash brightness control function according to claim 1, wherein the distance between the moving object and the monitoring camera is determined by testing strength of a trigger signal showing the moving object entering the camera range.

3. The monitoring method of the monitoring camera with an adaptive flash brightness control function according to claim 1, wherein a pyroelectric infrared sensor is applied to detect the moving object entering the camera range of the monitoring camera.

4. A monitoring camera with an adaptive flash brightness control function, comprising: a camera body, and a detection device, a processing device, a flash light and a drive device respectively configured on the camera body, wherein the detection device is arranged for detecting a trigger signal representing a moving object appearing in a scene in which the camera body is located, and feeding back the trigger signal; a processing device is arranged for receiving the trigger signal fed back by the detection device, then analyzing and calculating a distance between the moving object and the camera body according to the trigger signal; the processing device comprises an amplifying circuit for amplifying the trigger signal, an integrating circuit for converting the trigger signal into a level pulse, and an analyzing circuit that compares the level pulse with standard level pulses preset in the camera body to determine the distance between the moving object and the camera body; the flash light is arranged for providing a brightness compensation for the camera body at camera capturing moment; and the drive device is arranged for controlling flash brightness according to the distance calculated by the processing device.

5. The monitoring camera with an adaptive flash brightness control function according to claim 4, wherein the drive device comprises a PWM driver, which is electrically connected with the flash light.

6. The monitoring camera with an adaptive flash brightness control function according to claim 4, wherein the detection device comprises a pyroelectric infrared sensor.

7. A monitoring camera with an adaptive flash brightness control function, comprising a processor, a memory, and a program stored in the memory and executed by the processor, wherein the program comprises instructions for performing a monitoring method of the monitoring camera with an adaptive flash brightness control function, the monitoring method comprises: detecting whether a moving object enters a camera range of the monitoring camera; if yes, determining a distance between the moving object and the monitoring camera: detecting a trigger signal representing that the moving object enters the camera range and performing an integral processing to the trigger signal to obtain a level pulse representing the strength of the trigger signal, and comparing the level pulse with standard level pulses preset in the monitoring camera that correspond to different distances; and adjusting brightness of a flash light on the monitoring camera according to the distance between the moving object and the monitoring camera.

8. The monitoring camera with an adaptive flash brightness control function according to claim 7, wherein the distance between the moving object and the monitoring camera is determined by testing strength of a trigger signal showing the moving object entering the camera range.

9. The monitoring camera with an adaptive flash brightness control function according to claim 7, wherein a pyroelectric infrared sensor is applied to detect the moving object entering the camera range of the monitoring camera.

\* \* \* \* \*